(12) United States Patent
Okazawa

(10) Patent No.: US 6,493,101 B1
(45) Date of Patent: *Dec. 10, 2002

(54) PROGRAM MANAGEMENT APPARATUS AND METHOD, AND PROGRAM PRODUCT THEREFOR

(75) Inventor: Takashi Okazawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/440,942

(22) Filed: May 15, 1995

(30) Foreign Application Priority Data

May 13, 1994 (JP) .............................................. 6-099709
May 1, 1995 (JP) .............................................. 7-107331

(51) Int. Cl.$^7$ .............................................. G06F 15/00
(52) U.S. Cl. ...................................... 358/1.15; 358/1.13
(58) Field of Search ................................ 395/101, 109, 395/112, 113, 114, 275, 375; 358/403, 443, 444, 448, 530, 1.1, 1.9, 1.13, 1.14, 1.15; 707/500, 522, 523; 711/147, 170, 173; 714/100, 28, 29, 39; 710/1, 20; 712/1, 14, 28, 214

(56) References Cited

U.S. PATENT DOCUMENTS

| 5,075,874 A | * | 12/1991 | Steeves et al. ............... 395/112 |
| 5,228,118 A | * | 7/1993 | Sasaki ......................... 395/112 |
| 5,337,258 A | * | 8/1994 | Dennis ......................... 714/47 |
| 5,530,862 A | * | 6/1996 | Wadsworth et al. ......... 395/700 |
| 5,537,626 A | * | 7/1996 | Kraslavsuy et al. ......... 395/828 |
| 5,621,405 A | * | 4/1997 | Park et al. .................... 341/67 |

* cited by examiner

Primary Examiner—Gabriel Garcia
(74) Attorney, Agent, or Firm—Fitzpatrick, Cella, Harper & Scinto (57) ABSTRACT

A system for managing programs utilizes a memory to store a variable in an individual area or a common area in accordance with a type of the variable. The memory includes a first individual area, where a variable used by only a first program is stored even when the first program is not being executed, and a common area for storing a variable temporarily needed to execute the first program. When a second program is downloaded, a second individual area of the memory is assigned to store a variable used by the downloaded second program.

30 Claims, 9 Drawing Sheets

```
<ESC>%-12345X@PJL CJLMODE<CR><LF>
@PJL COMMENT Using @PJL INFO FLASHROM <CR><LF>
@PJL ECHO 22:41:12 03-03-95 <CR><LF>
@PJL INFO FLASHROM <CR><LF>
<ESC>%-12345X
```

FIG. 8

```
@PJL ECHO 22:41:12 12-12-93 <CR><LF>
<FF>
@PJL INFO FLASHFORM <CR><LF>
SLOT:1 <CR><LF>
        FROMTYPE = USER <CR><LF>
        FROMNAME = "KAKIGI" <CR><LF>
        FROMDATE = 19950303 <CR><LF>
        WRITEPROJECT = ON <CR><LF>
        FONT CScaler = [2 ENUMERATED] <CR><LF>
                "Ncourier10" <CR><LF>
                "Ganon-Logo" <CR><LF>
        MACRO = [1 ENUMERATED] <CR><LF>
                "LIPS MACRO#30" <CR><LF>
SLOT:2 <CR><LF>
        FROMTYPE = Ganon <CR><LF>
        FROMNAME = "MATOBA" <CR><LF>
        FROMDATE = 19950303 <CR><LF>
        WRITEPROJECT = OFF <CR><LF>
        FONT CScaler = [1 ENUMERATED] <CR><LF>
                "Swiss-Bold" <CR><LF>
        FONT GScaler = [1 ENUMERATED] <CR><LF>
                "TrueType" <CR><LF>
<FF>
```

PROGRAM MANAGEMENT APPARATUS AND METHOD, AND PROGRAM PRODUCT THEREFOR

BACKGROUND OF THE INVENTION

Present invention relates to a printing apparatus and a printing system having a function for downloading an object (program, information, subroutine etc.) from an external device and utilizing the downloaded object and a control method for the apparatus and the system.

A printing apparatus that downloads an object from an external device and utilizes the downloaded object generally has a downloader which performs downloading and manages information on downloaded object (download information). The printing apparatus performs further processing using the downloaded object.

However, in this printing apparatus, only the down loader can access the download information, further, the downloader does not forward the download information to the other programs for executing other functions. For this reason, the programs for other functions cannot refer to the download information, and a host computer and a user do not know the content of the data downloaded to the printing apparatus, which causes troubles in various processings and operation.

For example, when the host computer is to output print data, which is to be processed by using a download object, to the printing apparatus, the host computer first outputs the download object to the printing apparatus. Even if the printing apparatus already has the same download object, the host computer has no means to confirm the existence of the download object in the apparatus, therefore, wasteful overlapped downloading is performed.

Further, to utilize functions provided by download function or from an extended ROM (e.g., an emulator program), the printing apparatus must ensure a memory area for downloading. That is, to perform plural types of downloadings, a memory area corresponding to the respective downloadings is necessary. In this case, the memory always has a memory area assigned to even unused downloading, which lowers utilization efficiency of memory.

SUMMARY OF THE INVENTION

The present invention has been made in consideration of the above situation, and has as its object to provide a printing apparatus and system which utilizes a download object and which enables programs other than a downloader to refer to downloaded object information and a method for controlling the apparatus and system.

Another object of the present invention is to provide a printing apparatus capable of informing a user or an external device of the content of download information and a control method for the apparatus.

Another object of the present invention is to provide a printing apparatus which prevents overlapped downloading from a host computer to the printing apparatus by informing a host computer of download information and a control method for the apparatus.

Another object of the present invention is to provide a printing apparatus which performs improved management of memory assignment to a download program, thus simplifies memory management, saves memory capacity, and can change a download program and a program provided from an extended ROM easier.

According to the present invention, the above objects are attained by providing a printing apparatus comprising: load means for downloading an object from the outside of the apparatus; storage means for storing information on the object downloaded by the load means; read-out means for reading the information stored in the storage means; and output means for outputting the information read out by the read-out means.

According to the present invention having the above construction, the read-out means reads information on a downloaded object out of the storage means, and the output means outputs the read object to various devices each having a predetermined function.

Preferably, the output means outputs the information read out by the read-out means to an external device connected to the printing apparatus. This allows the external device to recognize the downloaded object and use the information in processings by various external devices.

Preferably, the output means performs display-output based on the information read out by the read-out means. This enables the printing apparatus to provide a user with the information on the downloaded object.

Preferably, the output means performs print-output based on the information read out by the read-out means. This enables the printing apparatus to provide the user with the information on the downloaded object in the form of print-out.

Preferably, the object is a patch program for partially changing a program installed in the printing apparatus. For example, an installed program including a bug can be corrected.

Preferably, the object is image data formed at the outside of the printing apparatus. For example, overlay data can be stored as an object, and this can increase the processing speed when the overlay data is used for printing a plurality of pages.

Further, the above objects are attained by providing a printing system comprising: an information processing apparatus and a printing apparatus connected to each other and can communicate with each other; storage means for, in the printing apparatus, storing information on a downloaded object; transfer means for reading the information stored in the storage means and transferring the information to the information processing apparatus; decision means for, upon transferring print data in the information processing apparatus, deciding whether an object necessary for processing the print data is available or not, based on the information transferred by the transfer means; and download means for, if the decision means decides that the object necessary for processing the print data is not available, downloading the object to the printing apparatus.

According to the present invention having the above construction, the information processing apparatus determines whether the object necessary for processing print data is available or not, and if the object is not available, downloads the necessary object to the printing apparatus. As the necessary object is downloaded only when required, unnecessary downloading is prevented.

Further, the above objects are attained by providing a printing apparatus comprising: load means for downloading an object from the outside of the printing apparatus; ensuring means for ensuring an individual area for the object downloaded by the load means, from a memory; and execution means for executing the processing of the object using a common area ensured on the memory in advance for a plurality of objects and the individual area ensured by the ensuring means.

According to the present invention having the above construction, a storage area for storing data used in executing a downloaded object program is commonly used for execution of a plurality of download programs. Thus, work areas respectively assigned for the object programs can be saved. A work area uniquely for an object program is ensured at each downloading, however, the unique work area is smaller than the common storage area. This simplifies management of memory areas used for downloaded programs and reduces memory capacity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

First, the construction of a laser beam printer to which the embodiments of the present invention are applied will be described with reference to FIG. 13.

Figure 13:
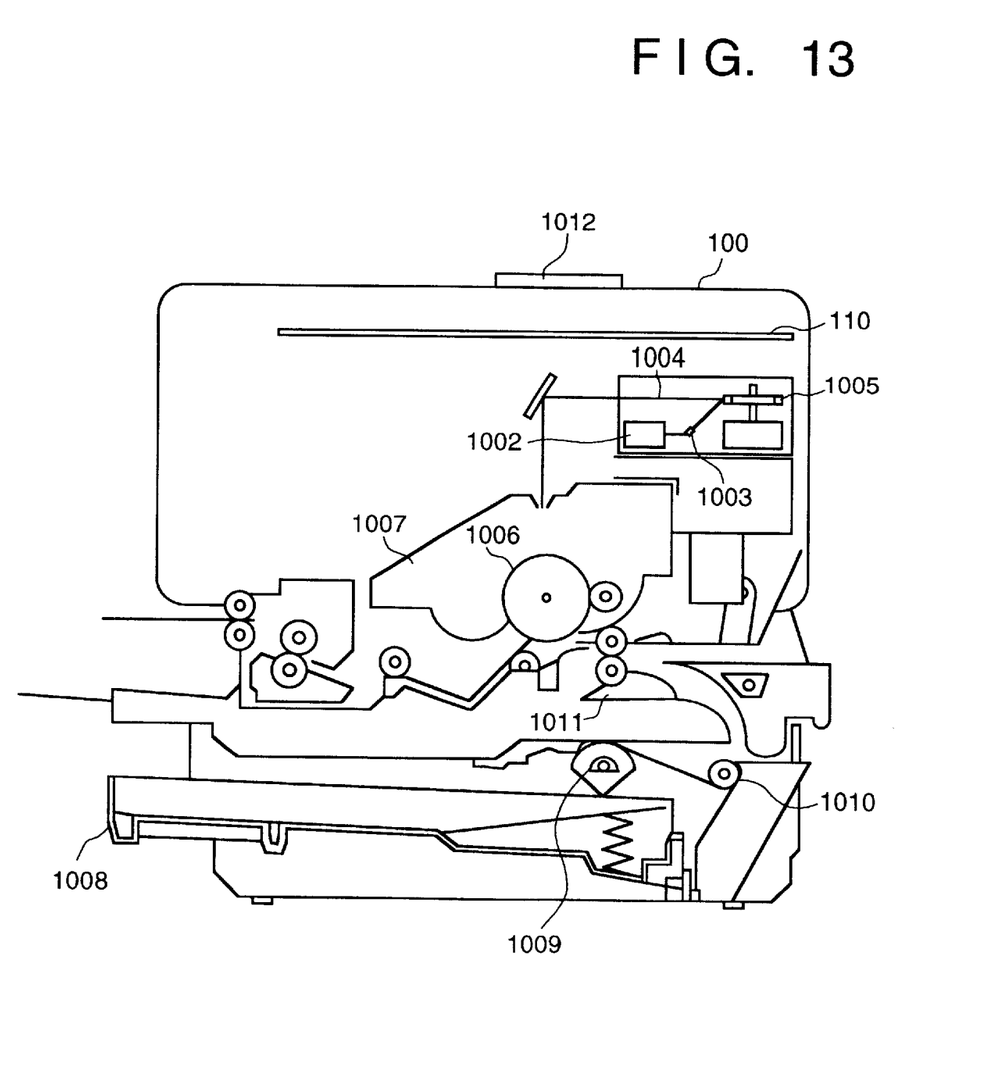
FIG. 13 is a cross-sectional view showing the construction of a laser-beam printer of the first and second embodiments.

FIG. 13 shows the construction of the laser-beam printer (hereinafter simply referred to as "printing apparatus") of the embodiments. This printing apparatus allows registration of character patterns and form data from a data source (not shown).

In FIG. 13, reference numeral 100 denotes a printing apparatus main body which inputs print information (character codes and the like) from an external host computer (not shown) connected to the apparatus, form information or a macro command and stores the input information, and forms character patterns and form patterns in accordance with the stored information, to form images on recording sheets as printing media; 1012, an operation panel having operation switches, a LED display and so on; and 110, a controller which controls the overall printing apparatus 100 and interprets, e.g., character information supplied from the host computer. The controller 110 mainly converts character information into a video signal of a corresponding character pattern, and outputs the signal to a laser driver 1002.

The laser driver 1002, a circuit for driving a semiconductor laser 1003, performs onoff control of laser light 1004 emitted from the semiconductor laser 1003. The laser light 1004 scan-exposes an electrostatic drum 1006 by the reflection of a rotating polygon mirror 1005, which forms a latent image of a character pattern on the electrostatic drum 1006. The latent image is developed by a developing unit 1007 provided around the electrostatic drum 1006 and transferred to the recording sheet. The recording sheet is a cut sheet contained in a paper cassette 1008 attached to the printing apparatus 100, supplied within the printing apparatus by a paper feed roller 1009 and convey rollers 1100 and 1011, to the electrostatic drum 1006.

Note that the laser-beam printing apparatus 100 is employed in the following description of the embodiments, however, the present invention is applicable to other printers such as an ink-jet printer.

First Embodiment

Figure 1:
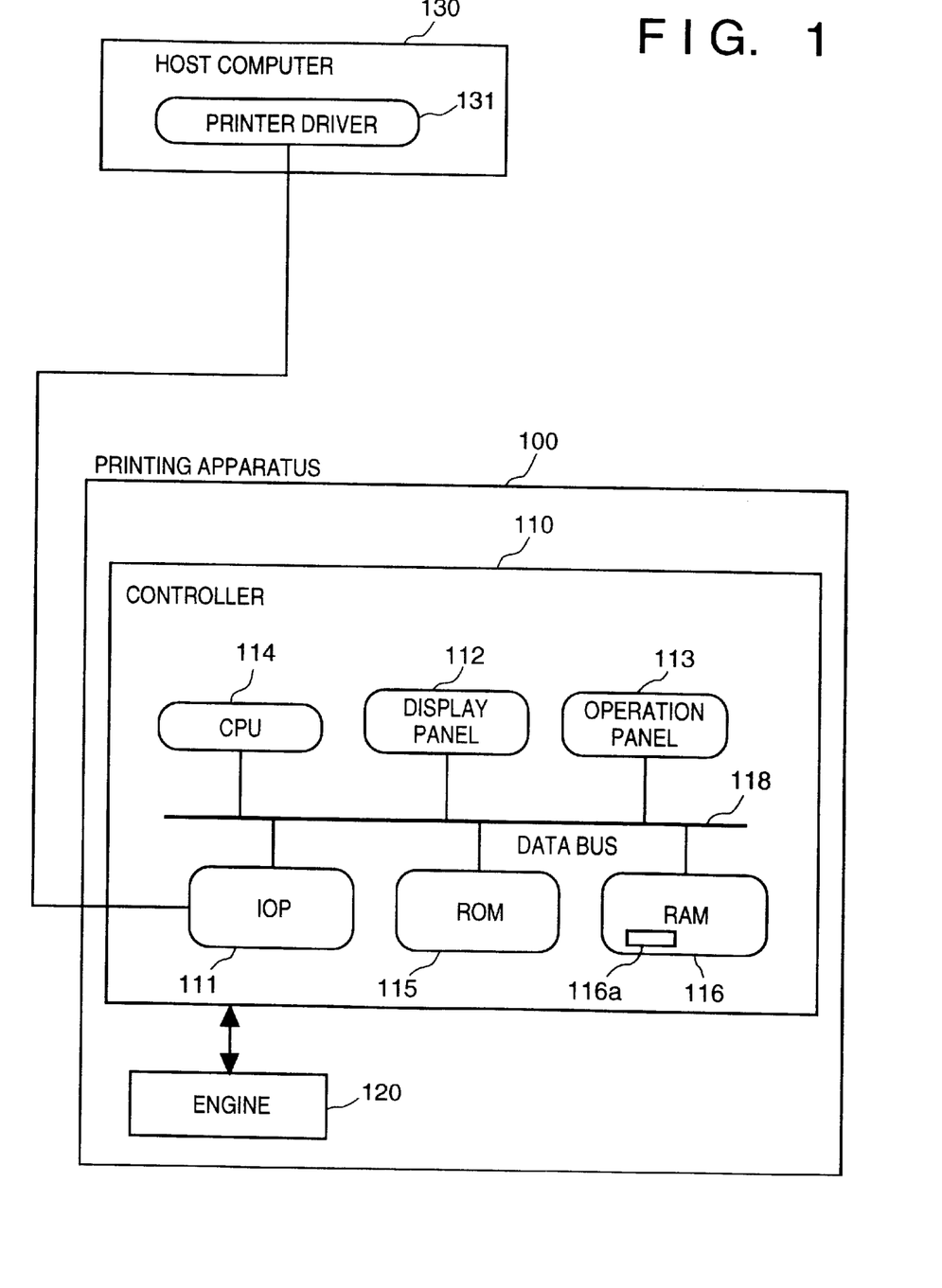
FIG. 1 is a block diagram schematically showing the construction of a control system of a printing apparatus according to a first embodiment of the present invention.

FIG. 1 schematically shows the construction of a control system of a printing apparatus according to a first embodiment of the present invention. In FIG. 1, reference numeral 100 denotes a printing apparatus comprising a controller 110 and an engine 120. The controller 110 receives print data and control instructions from an external device, and forms image memory data in accordance with the received data, and transfers the image memory data as a video signal to the engine 120. The engine 120 receives the video signal from the controller 110 and forms a visible image based on the signal, on a recording sheet. The controller 110 perform communication with the engine 120 to inform the external device of the status of the engine 120, and controls the overall engine 120.

Next, the controller 110 will be described in detail. The controller 110 has an input-output processor (IOP) 111, a display panel 112, an operation panel 113, a CPU 114, a ROM 115, a RAM 116 and a data bus 118.

The IOP 111 transfers receives data to/from an external device, e.g., a host computer 130. The display panel 112 displays printing apparatus information such as parameters of printing environment. The operation panel 113 inputs settings of various parameters of print environment and changes of the parameters. The CPU 114 controls the overall apparatus, interprets print data, and forms image data. Apparatus control programs, control languages, font information and so on are stored in the ROM 115. The RAM 116 provides a temporary storage area for storing data from an external device and various print parameters, and also provides a work area for information processing. The RAM 116 has a download information storage 116a. The data bus 118 connects the respective devices for transferring various data in the controller 110.

It should be noted that in this embodiment, "download" is to transfer "object" data from an external device into a RAM 116a of the printing apparatus or a re-writable device when the power of the apparatus is turned on. The loading of object enables the apparatus to use various additional printing functions. Further, "object" which is data, e.g., font data, can be accessed from a program executed by the printing apparatus and a program in the printing apparatus.

Figure 2:
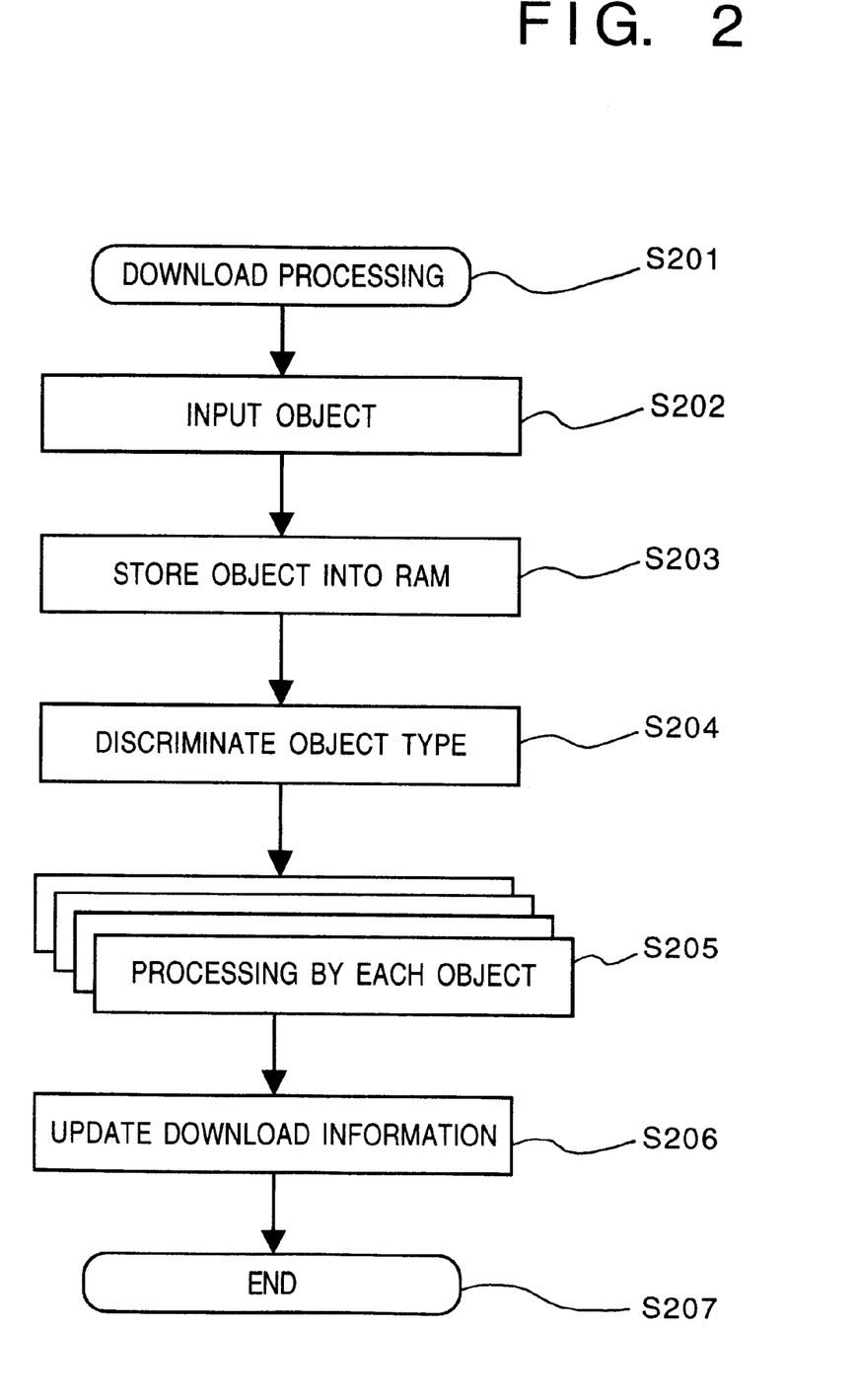
FIG. 2 is a flowchart showing a download processing procedure according to the first embodiment.

FIG. 2 shows a downloading processing procedure according to the present embodiment. When a downloader is started (step S201), an object is inputted from an external device via a communication line (step S202). The input object is stored into the RAM 116 (step S203). Next, the type of the object is discriminated (step S204), and an interface between the internal programs and the object is changed (step S205) by each object. Finally, download information is updated (step S206), and the process ends.

It should be noted that the discrimination of the type of object in step S204 is, e.g., to determine whether the object is a program or data. In this case, if the object is a program, whether the program is a translator program, a scaler program or a patch program is determined. If the object is data, whether the data is font data, macro data or table data (tile data, dither pattern data etc.) is determined. The change of the interface between the internal programs and the object in step S205 is made by registering a downloaded object in accordance with the result from the discrimination of the object type.

Figure 3:
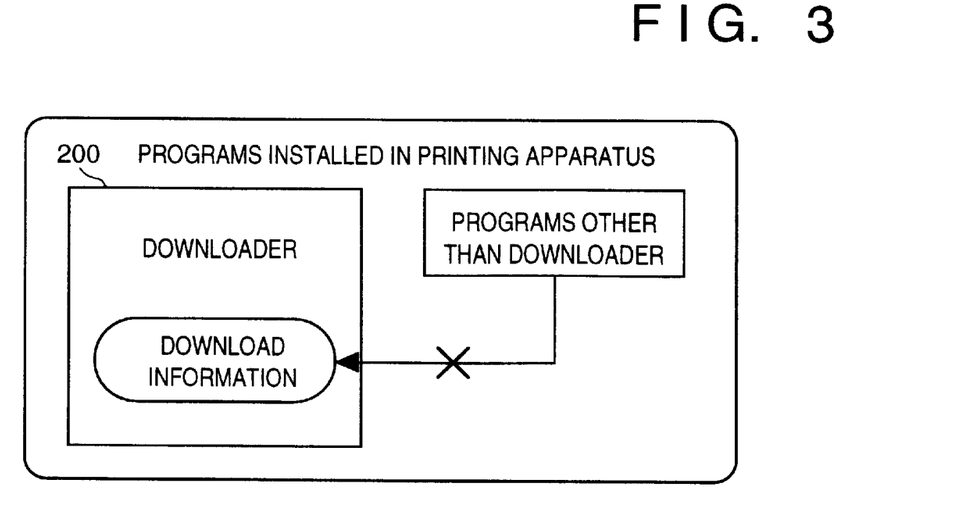
FIG. 3 is an explanatory view showing the construction of a download program in a general printing apparatus.

As described above, in the conventional printing apparatus, a downloader updates download information only in download processing. FIG. 3 shows the program construction regarding download information in the conventional printing apparatus. Only the downloader 200 manages the download information 116a, and only the downloader 200 can refer to and update the download information. Further, the downloader 200 lacks function for informing other programs of the download information, accordingly, the other programs cannot refer to the download information upon executing other functions.

Figure 4:
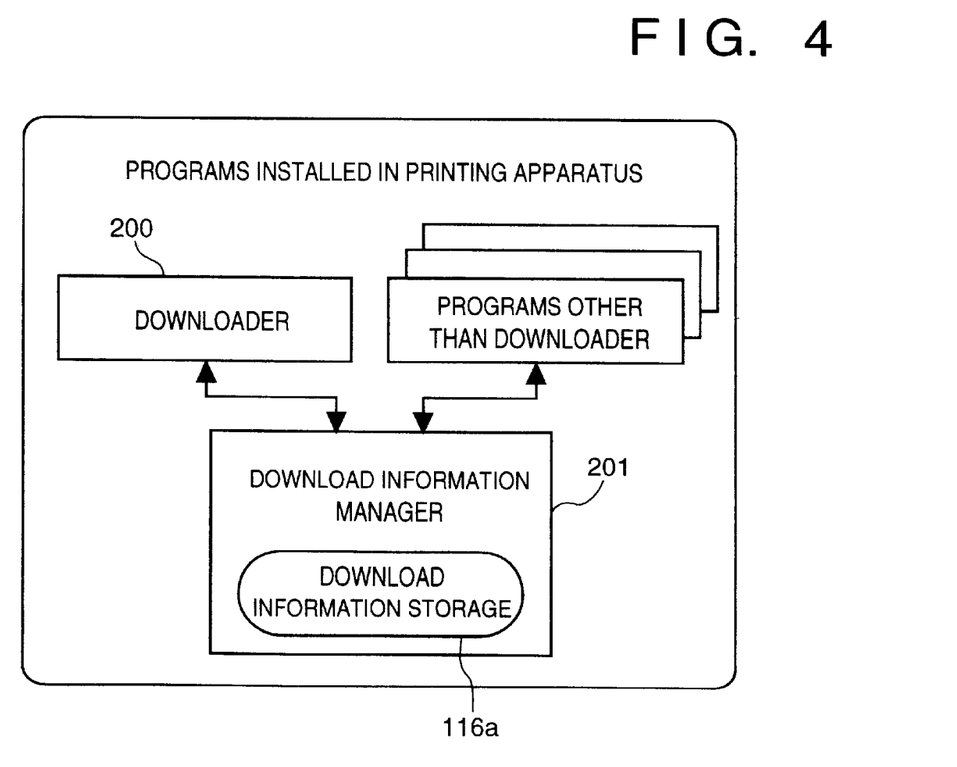
FIG. 4 is an explanatory view showing the construction of a download program in the printing apparatus of the first embodiment.

On the other hand, according to the present embodiment, programs as well as the downloader have access right to various download information. FIG. 4 shows the program access structure regarding download information in the printing apparatus according to this embodiment. In this embodiment, the downloader does not have direct access to the various download information. As shown in FIG. 4, the download information is directly accessed by a download information manager 201. After downloading, the downloader 200 updates the download information 116a by requiring the download information manager 201 to update the information. In a case where the downloader 200 is to refer to the download information, the downloader 200 inquires the download information manager 201 for the download information. Similarly, in a case where another program is to refer to the download information, the program inquires the download information manager 201 for the download information. As shown in FIG. 4, the control programs for executing other functions can refer to the download information. Thus, a user can easily grasp downloading status. For example, if information on an object downloaded (download information) in the printing apparatus is outputted to the host computer, the host computer can display the received information and perform various processings with the information. The output procedure by the printing apparatus in this case will be described below.

Figure 5A:
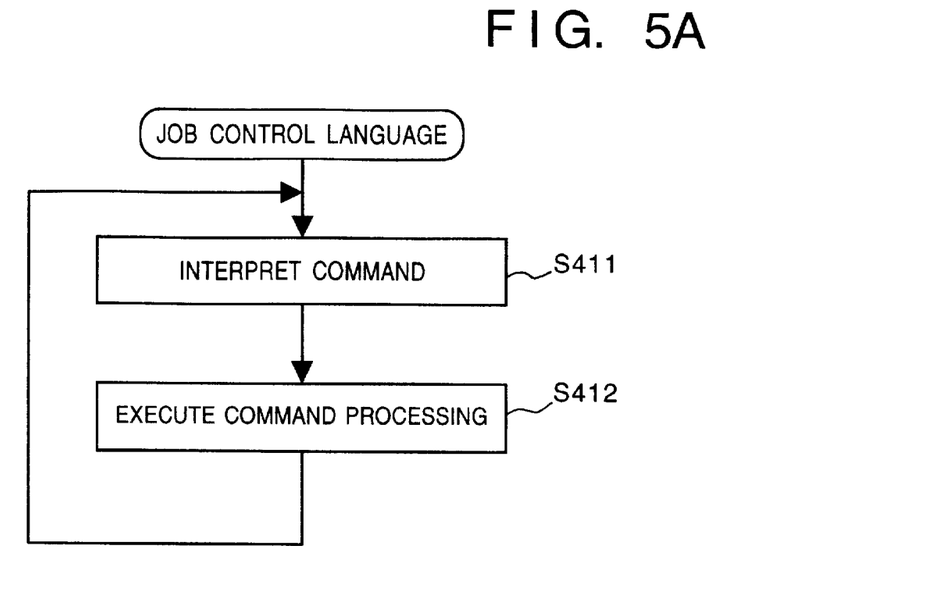
FIGS. 5A and 5B are flowcharts showing a download information output procedure according to the first embodiment.

FIG. 5A shows the procedure when the present printing apparatus receives a job control language data. The host computer 130 and the printing apparatus 100 are capable of bidirectional communication therebetween, and a program (printer driver 131 (FIG. 1)) controlling the printing apparatus 100 runs on the host computer 130. The printer driver 131 performs bidirectional communication with the printing apparatus 100 to obtain information on the status and settings of the printing apparatus 100. This communication is executed by transferring a job control language data to the printing apparatus 100.

In this example, the host computer 130 transfers a job control command to inform of download information to the printing apparatus 100. The printing apparatus 100 receives the job control command, interprets the received command, and executes the command processing (steps S411 and S412).

Figure 5B:
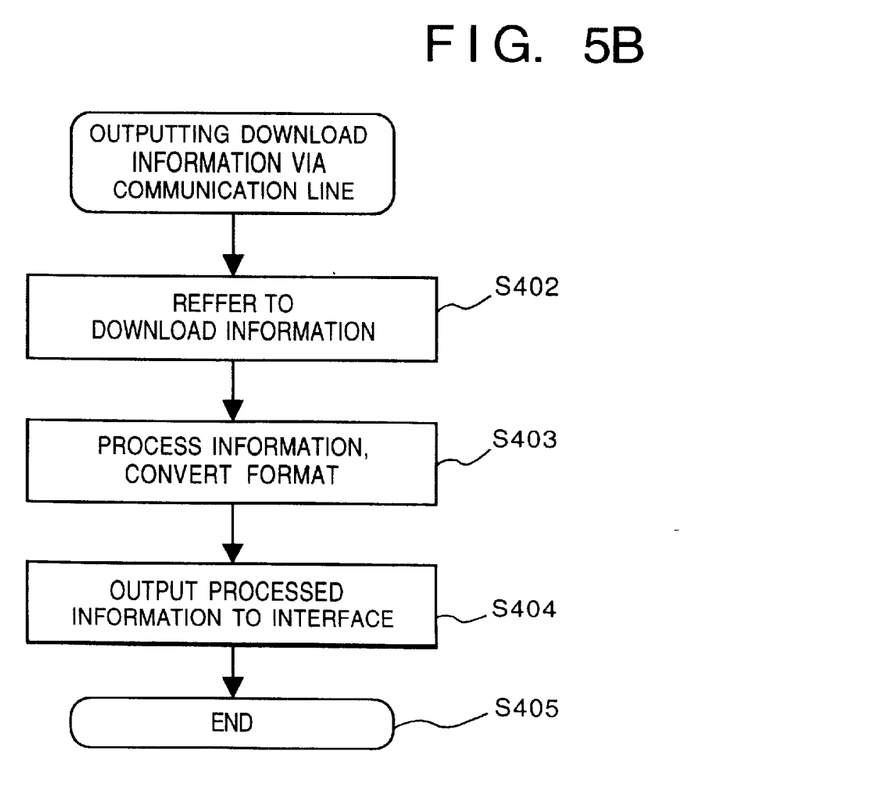

FIG. 5B shows the procedure for outputting download information to an external device via a communication line. The process starts when a download-information output request is received from the external device (host computer 130). In step S402, the download information is read out of the download information storage 116a. In step S403, the read download information is processed to be information appropriate for communication to the external device, and the format of the information is converted to that suitable for communication. Finally, the information resulted from step S403 is outputted to the interface (IOP) 111 in step S404.

Thus, the download information is transferred via the interface to the host computer 130. Next, processing of the information in step S403 will be described. The download information manager 201 reads download information from the download information storage 116a. As the data format is recognizable to the download information manager 201, upon outputting the download information to the host computer 130, the data format is changed to that recognizable to the host computer. Then, the data format is converted to, e.g., text format in which the host computer can recognize the data.

In this manner, download information can be outputted to, e.g., the host computer 130. Next, the operation of the host computer using the download information from the printing apparatus, according to the first embodiment will be described with reference to the flowcharts in FIGS. 6A and 6B.

Figure 6A:
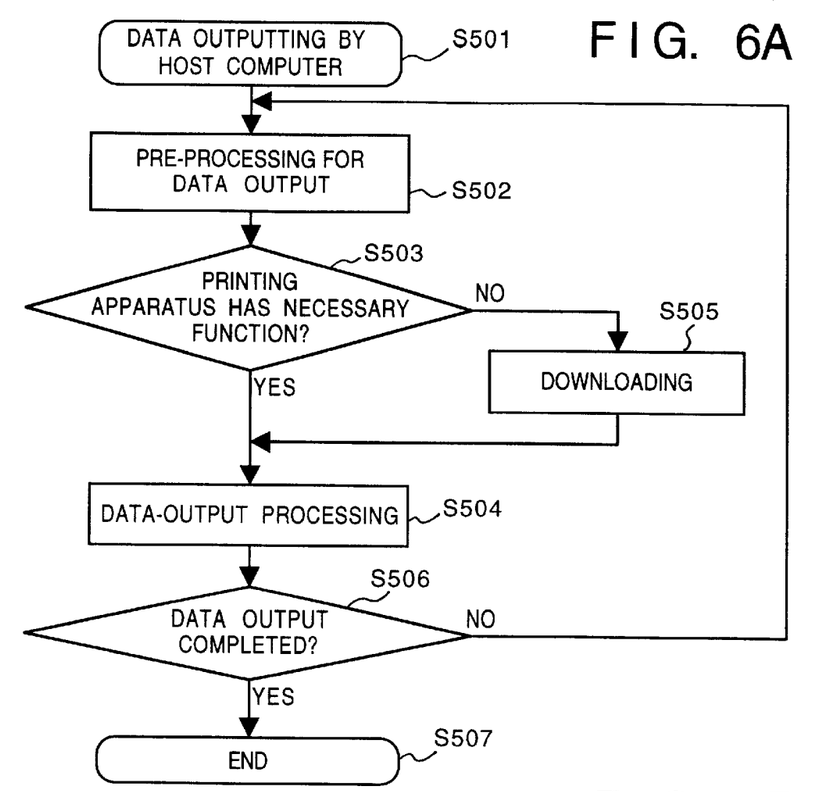
FIGS. 6A and 6B are flowcharts showing a processing procedure in a host computer using download information from the printing apparatus of the first embodiment.
Figure 6B:
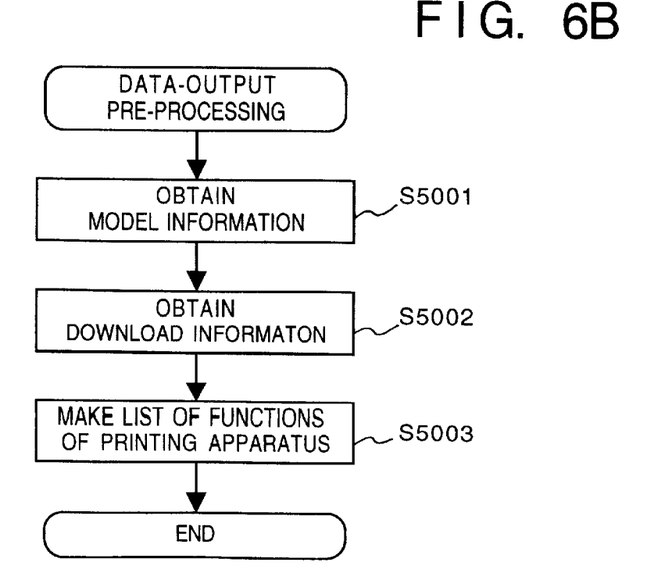

The host computer 130 and the printing apparatus can perform bi-directional communication. On the host computer 130, a program controlling the printing apparatus (printer driver 131) is running. The printer driver has various download objects in advance, and can perform various extended functions in the printing apparatus by downloading these objects in accordance with necessity.

In step S502, printer connecting and setting of a printer type are made as pre-processing for data output. Further, download information is received from the printing apparatus 100. FIG. 6A shows in detail the pre-processing for data output in step S502. In the pre-processing, information on the model of the connected printing apparatus is obtained (step S5001). Then, the download information indicative of the already downloaded contents is obtained (step S5002). Finally, the function added to the printing apparatus is recognized based on the download information, and a list of the functions already installed in the apparatus is made (step S5003). Next, in step S503, whether or not the printing apparatus 100 has functions necessary for printing to be executed is determined. For the determination, information of the functions of the printing apparatus and download information indicative of an object downloaded to the printing apparatus 100 are accessed.

If YES in step S503, i.e., the printing apparatus 100 has the necessary functions for the printing processing, the process proceeds to step S504, in which print data is outputted. On the other hand, if a function which does not exist in the printing apparatus 100 is used for the printing, the process proceeds to step S505, in which an object for executing the function is downloaded. Then the printing processing is performed based on the output print data using the downloaded object. In step S506, whether or not print-data output has been completed is determined. If NO, the process returns to step S502 to continue the print-data output. If YES, the process ends.

In this example, the object is downloaded to the RAM 116, however, the object may be downloaded to another device so far as it is a re-writable device. For example, a flash ROM may be used as a downloading destination. The flash ROM is writable and deletable, and can be used as an extended ROM.

Figure 7:
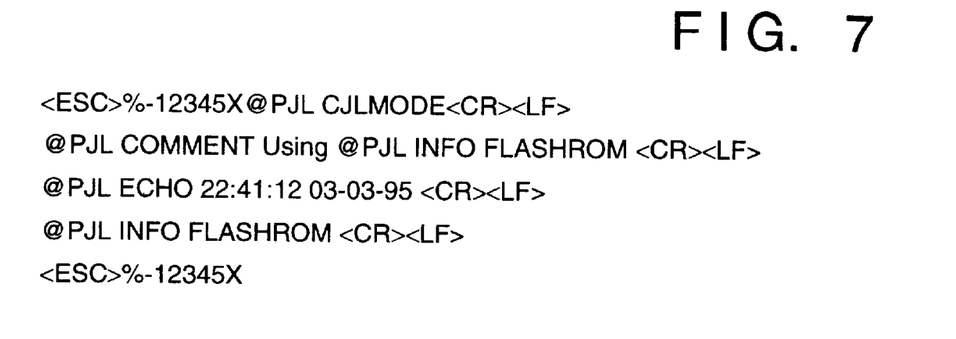
FIG. 7 is an example of commands in a job control language transferred from the host computer to the printing apparatus.
Figure 8:
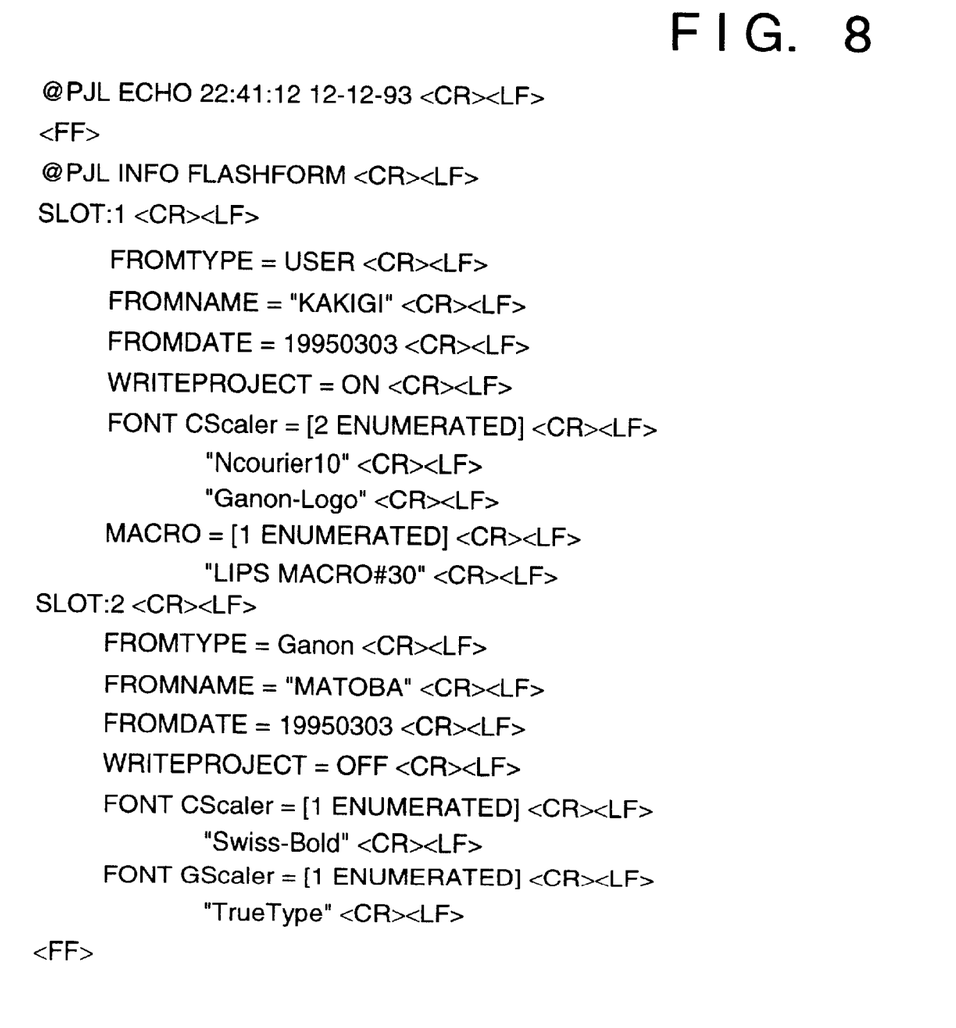
FIG. 8 is an example of information transferred in response to the commands in FIG. 7 from the printing apparatus to the host computer.

FIG. 7 shows a series of commands in a job control language transferred from the host computer 130 to the printing apparatus 100 to inquire for download information. In this example, the commands require information on the function stored in a flash ROM. FIG. 8 shows data transferred from the printing apparatus 100 to the host computer 130 in response to the commands shown in FIG. 7. The data shows that the printing apparatus 100 has flash ROM's attached to a slot 1 and a slot 2, and a font scaler, a macro program etc. are stored in the respective ROM's.

Note that in this process procedure, the existence/absence of necessary functions of the printing apparatus is checked at every printing processing, however, this check may be made in a prior stage to printing so that the printing processing may be performed in accordance with the checked result. For example, as in a prior stage, check is made immediately before an initial printing processing, or when the power of the printing apparatus is turned on.

Figure 9:
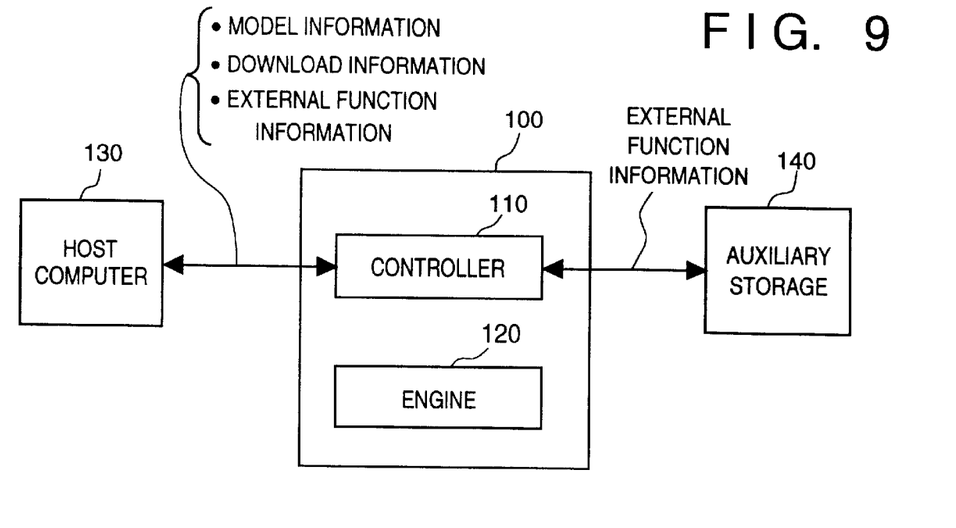
FIG. 9 is a block diagram showing an auxiliary storage containing download objects, connected to the printing apparatus.

As shown in FIG. 9, in a case where the printing apparatus 100 itself comprises an auxiliary storage 140 such as a hard disk, and download data is stored in this storage but not downloaded to the printing apparatus yet, the host computer 130 does not perform downloading, and the download data stored in the auxiliary storage 140 is used. In this case, the information that the host computer 130 receives from the printing apparatus 100 includes model information, from which the host computer 130 recognizes the functions installed in the printing apparatus 100, information on the function of downloaded object (download information), and external function information on the function of the download data stored in the auxiliary storage 140.

As described above, according to the present embodiment, download information can be referred by not only the downloader but also the programs for other functions such as a print-execution program in the host computer 120. Accordingly, e.g., in the host computer 120, unnecessary downloading is prevented, thus the processing speed as in the system can be raised.

It should be noted that in this embodiment, download information is outputted via the communication line, however, the download information may be outputted to the display panel of the printing apparatus. In this case, the printing apparatus shows the user the download information. Further, the host computer 130 may display the download information received via the communication line on its display panel.

In addition, as in a download-information output method, the printing apparatus itself may print out download information.

Note that in the printing apparatus of this embodiment, new functions, such as font data, description language data for controlling the printer (emulator) and a scaler for image information processing may be included. Thus, in addition to the printing environment provided with the functions initially installed in the printing apparatus, various printing environments can be provide by downloading a plurality of functions. Further, to prevent execution of unnecessary downloading, the processing as shown in FIGS. 6A and 6B can be used.

As described above, new functions are added by downloading, however, since the present printing apparatus enables the programs other than downloader to refer to download information, information that may be downloaded is not limited to these functions. For example, if a program (function) in the ROM 115 has a bug, the corrected function (patch program) may be downloaded to avoid the bug. Specifically, information on the bug may be included in download information as a patch program to be used by the program in the ROM 115. If there are a plurality of types of the printing apparatus, patch programs corresponding to these apparatus types can be made.

Figure 10:
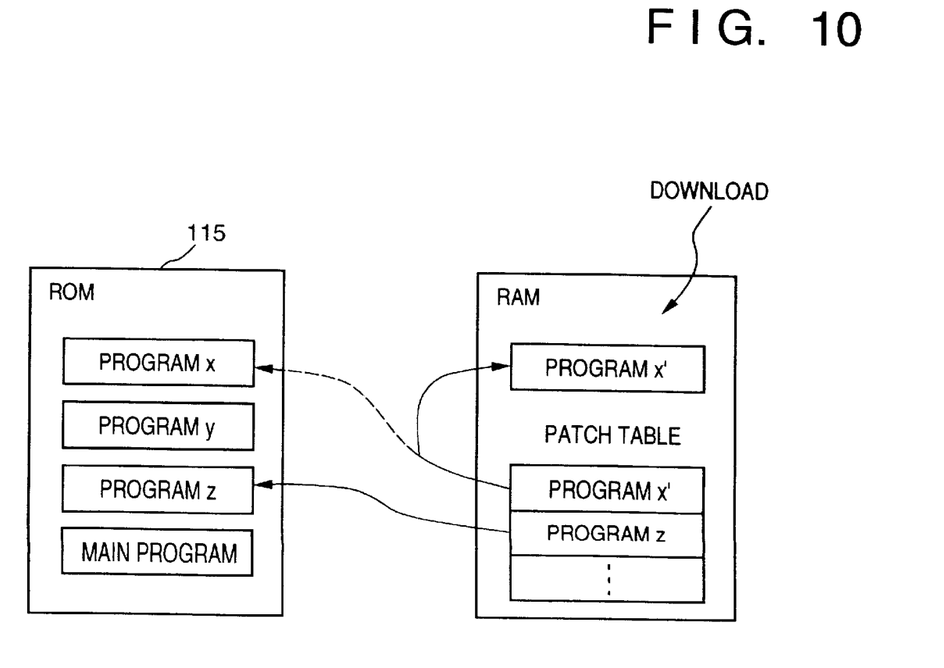
FIG. 10 is a block diagram showing a construction for downloading patch programs.

FIG. 10 shows a construction for downloading of patch programs. In FIG. 10, programs x, y and z in a ROM 115 are subprograms respectively executed as requirement in a main program. The main program forms a patch table indicating storage addresses of the subprograms in the RAM 116, and refers to the patch table to execute a necessary subprogram.

When a patch program is downloaded, the patch program is stored into the RAM 116. At this time, The address of the subprogram in the patch table is changed to an address in the RAM 116 where the patch program has been downloaded. FIG. 10 shows a status in which the patch program x' is downloaded with respect to the subprogram, and the contents of the patch table is changed in accordance with the downloading. As a result, the main program refers to the patch table and executes the patch program x'.

Normally, the printing apparatus interprets print processing description language received from an external device and forms print information of image information to the engine based on the description language. This processing can be performed outside of the apparatus and the processing result can be downloaded into the printing apparatus. This enables utilization of a function not installed in the printing apparatus without changing the construction of the apparatus. For example, image data which is often used as a document format (overlay data) is processed by the host computer in advance, and the result as developed image data is downloaded to the printing apparatus. The downloaded data is accessed upon printing. As a result, development of the format image data at each one-page printing can be omitted, thus processing time can be saved.

It should be noted that in the first embodiment, the download information is accessed in accordance with the job control language data received from the host computer 130, however, this does not pose any limitation on the present invention. The access to download information can be made, e.g., by key-input from the operation panel of the printing apparatus 100.

Second Embodiment

In this embodiment, memory assignment of the external variable area for providing programs by downloading or from an extended ROM will be described.

In this example, memory assignment in case of program downloading, especially providing an emulator program (translator program for a page description language) by downloading or from an extended ROM will be described.

Generally, when an emulator is downloaded, an external variable area in an RAM is dynamically ensured at each downloading. In a case where the emulator is provided from an extended ROM, the external variable area is accessed with an absolute address. Accordingly, an area for the emulator is ensured in advance.

Normally, even in a case where a plurality of emulator programs are loaded, two or more emulator programs are not activated simultaneously. However, it is necessary to store an external variable of each emulator. Accordingly, areas ensured for the emulators are exclusively used for the corresponding emulators, but not available for other programs.

According to the second embodiment, an external variable area is divided into areas for storing external variables of emulators even in non-operating time, and a common area for storing external variables temporarily necessary in execution of the emulators.

That is, in the second embodiment, on the assumption that two emulators are not activated simultaneously, the common area ensured in advance is used as an external variable area. This common area is used for all the emulators. This memory assignment omits assignment of an external variable area for an extended emulator. On the other hand, if the whole external variable area is used as a common area, in a case were an emulator is changed to another emulator and then the former emulator is executed again, the prior state is no longer stored in the common area. For this reason, to store the prior states of non-operating emulator in the external variable area, areas for storing these external variables are assigned to the corresponding emulator programs in advance.

Figure 11:
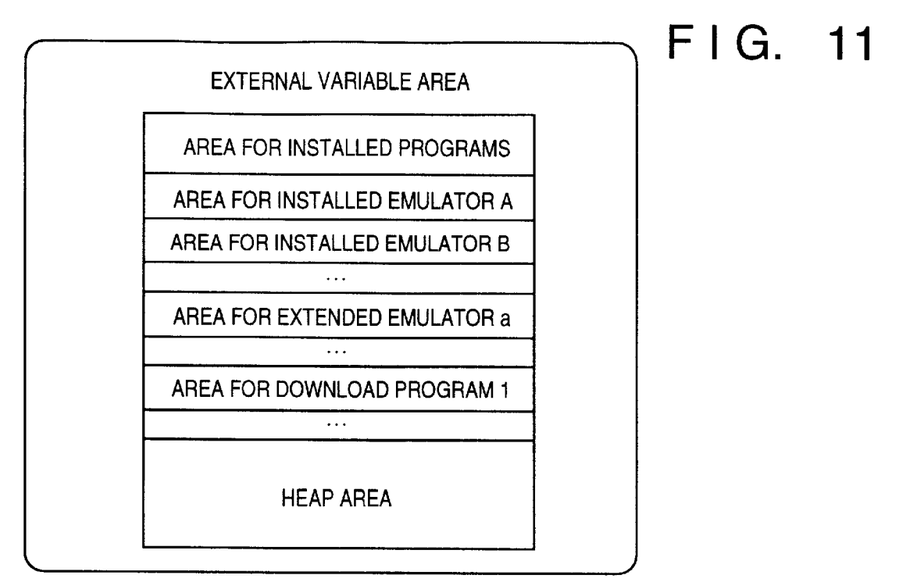
FIG. 11 is a block diagram showing assignment of areas in an external variable area of a RAM of a conventional printing apparatus.
Figure 12:
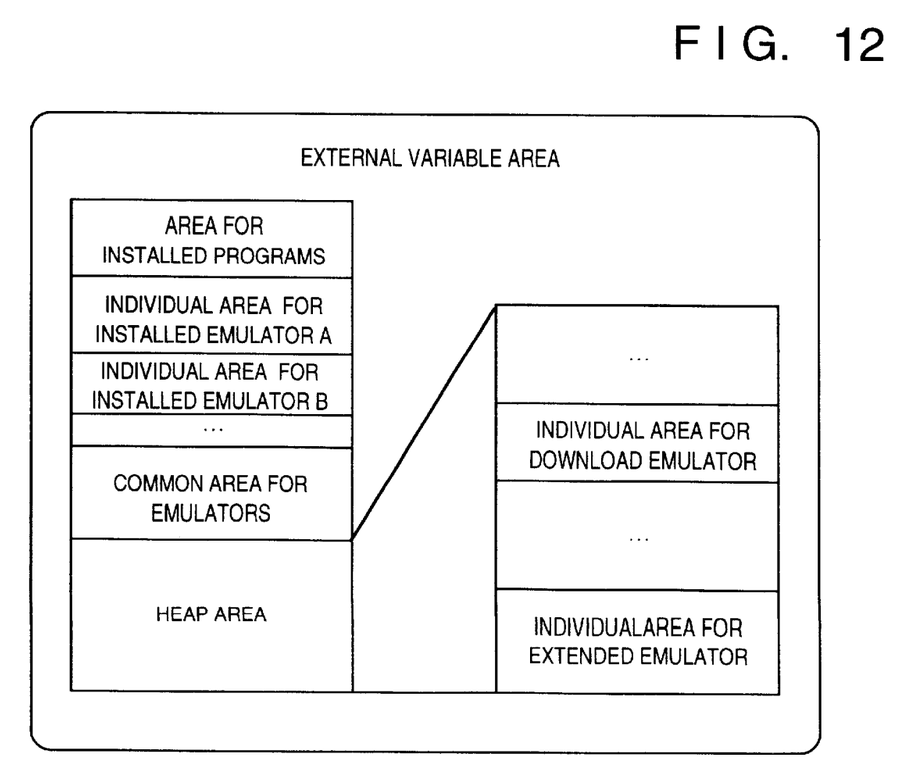
FIG. 12 is a block diagram showing an external variable area of a RAM of a printing apparatus according to a second embodiment.

FIG. 11 shows the general assignment of external variable areas on the RAM. In this example, external variable areas are respectively assigned to the corresponding emulators. There is no classification as an area uniquely assigned to an emulator or a common area, and all the necessary external variable areas are used regardless of execution/non-execution of each emulator. On the other hand, FIG. 12 shows assignment of external-variable areas on the RAM according to the second embodiment. In this embodiment, an individual area and a common area are assigned to each emulator. The common area is used by the various emulator programs, and is assigned to a predetermined address. Each emulator program access the common area with an absolute address. On the other hand, each individual area uniquely assigned to each emulator program is dynamically assigned when the emulator program is downloaded or provided from an extended ROM. Accordingly, the access to the individual area is made with an relative address.

As described above, according to the second embodiment, a common area used by all the emulator programs can be provided. Generally, as the capacity (bytes) of an individual area is smaller than that of a common area, in a printing apparatus which can selectively use a plurality of emulator programs, a necessary memory amount can be effectively reduced by providing a common area to be used for the emulator programs.

It should be noted that the second embodiment is described in a case of emulator programs, however, the above method is applicable to any case where an object program is alternatively executed from a plurality of programs.

In the second embodiment, a flash ROM can also be used as a downloading destination device. In this case, the flash ROM after the downloading operates similarly to an extended ROM when it is attached to the printing apparatus. Note that the object is stored at an address of the flash ROM, however, an external variable areas (individual and common) are assigned on the RAM.

It should be noted that the above first and second embodiments may be combined to save wasteful memory consumption due to overlapped downloading of emulator programs.

As described above, according to the first embodiment, since download information can be accessed from programs other than a downloader, the download information can be outputted to an external device. The external device such as a host computer can perform efficient processing using the download information.

Further, the printing apparatus can inform the user of various download information by outputting the information to the display panel or print-outputting the information.

According to the second embodiment, the RAM 116 has an external area divided into a common area and individual areas, and the common area is available for all the download programs. This reduces memory management and saves storage amount.

As described above, the present invention provides a printing apparatus which utilizes a download object and which enables programs other than a downloader to refer to information on the download object.

Further, the present invention enables to inform a user or an external device of the content of download information.

Furthermore, the present invention prevents overlapped downloading from a host computer to a printing apparatus by transferring download information in the printing apparatus to the host computer, thus improves processing speed in the system.

According to the present invention, since a common area is available to all the download programs, memory management can be simplified and storage amount can be saved. By virtue of this simple memory management, a download program can be easily changed.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A program management apparatus comprising:
    a memory that includes a first individual area, where a first parameter used by only a first program is stored even when not executing the first program, and a common area for storing a second parameter temporarily necessary to execute the first program, said memory storing a parameter into either the first individual area, as the first parameter, or the common area, as the second parameter, in accordance with a type of the parameter; and assigning means for, when a second program is downloaded, assigning a second individual area of said memory to store a third parameter used by the downloaded second program.

2. The apparatus according to claim 1, wherein the downloaded second program is an emulation program.

3. The apparatus according to claim 2, further comprising:

storing means for storing a plurality of emulation programs; and selecting means for selecting an emulation program to be utilized from the plurality of emulation programs stored by said storing means.

4. The apparatus according to claim 2, wherein said program management apparatus is a printer.

5. The apparatus according to claim 1, wherein the second program is downloaded by loading a program from an extended ROM.

6. The apparatus according to claim 1, wherein the second program is downloaded from a host computer.

7. The apparatus according to claim 1, wherein each of the first and second programs accesses its respective individual area using an absolute address and accesses the common area using a relative address.

8. The apparatus according to claim 1, further comprising output means for outputting download information indicating a program that has been downloaded to an external apparatus.

9. The apparatus according to claim 1, wherein the second program is downloaded from an external apparatus when the external apparatus determines that said program management apparatus does not have a necessary function.

10. The apparatus according to claim 1, further comprising execution means for executing a plurality of programs while switching the plurality of programs.

11. A program management method of a program management apparatus that utilizes a memory that includes a first individual area, where a first parameter used by only a first program is stored even when not executing the first program, and a common area for storing a second parameter temporarily necessary to execute the first program, said method comprising the steps of:

storing a parameter into either the first individual area, as the first parameter, or the common area, as the second parameter, of the memory in accordance with a type of the parameter; and assigning, when a second program is downloaded, a second individual area of the memory to store a third parameter used by the downloaded second program.

12. The method according to claim 11, wherein the downloaded second program is an emulation program.

13. The method according to claim 12, further comprising the steps of:

storing a plurality of emulation programs in the memory; and selecting an emulation program to be utilized from the plurality of emulation programs stored in the memory.

14. The method according to claim 12, wherein the program management method is performed in a printer.

15. The method according to claim 11, wherein the second program is downloaded by loading a program from an extended ROM.

16. The method according to claim 11, wherein the second program is downloaded from a host computer.

17. The method according to claim 11, wherein each of the first and second programs accesses its respective individual area using an absolute address and accesses the common area using a relative address.

18. The method according to claim 11, further comprising the step of outputting download information indicating a program that has been downloaded to an external apparatus.

19. The method according to claim 11, wherein the second program is downloaded from an external apparatus when the external apparatus determines that the program management apparatus dose not have a necessary function.

20. The method according to claim 11, further comprising the step of executing a plurality of programs while switching the plurality of programs.

21. A computer program product comprising a computer-readable medium storing computer program code for executing a program management method of a program management apparatus that utilizes a memory that includes a first individual area, where a first parameter used by only a first program is stored even when not executing the first program, and a common area for storing a second parameter temporarily necessary to execute the first program, the method comprising the steps of:

storing a parameter into either the first individual area, as the first parameter, or the common area, as the second parameter, of the memory in accordance with a type of the parameter; and assigning, when a second program is downloaded, a second individual area of the memory to store a third parameter used by the downloaded second program.

22. The product according to claim 21, wherein the downloaded second program is an emulation program.

23. The product according to claim 22, wherein the method further comprises the steps of:

storing a plurality of emulation programs; and selecting an emulation program to be utilized from the plurality of emulation programs.

24. The product according to claim 22, wherein the program management method is performed in a printer.

25. The product according to claim 21, wherein the second program is downloaded by loading a program from an extended ROM.

26. The product according to claim 21, wherein the second program is downloaded from a host computer.

27. The product according to claim 21, wherein each of the first and second programs accesses its respective individual area using an absolute address and accesses the common area using a relative address.

28. The product according to claim 21, wherein the method further comprises the step of outputting download information indicating a program that has been downloaded to an external apparatus.

29. The product according to claim 21, wherein the second program is downloaded from an external apparatus when the external apparatus determines that the program management apparatus does not have a necessary function.

30. The product according to claim 21, wherein the method further comprises the step of executing a plurality of programs while switching the plurality of programs.

* * * * *

UNITED STATES PATENT AND TRADEMARK OFFICE
CERTIFICATE OF CORRECTION

PATENT NO. : 6,493,101 B1 Page 1 of 1
DATED : December 10, 2002
INVENTOR(S) : Takashi Okazawa It is certified that error appears in the above-identified patent and that said Letters Patent is hereby corrected as shown below:

Title page,
Item [56], References Cited, U.S PATENT DOCUMENTS, insert -- 5,671,341  9/1997 Kashiwazaki et al. 395/112 --.

Drawings,
Sheet 4, Fig. 5B, "REFFER TO" should read -- REFER TO --.

Column 4,
Line 22, "onoff" should read -- on/off --.
Line 59, "transfers receives" should read -- transfers/receives --.

Column 9,
Line 59, "an" should read -- a --.

Column 12,
Line 12, "dose" should read -- does --.

Signed and Sealed this

Fourth Day of November, 2003

JAMES E. ROGAN
*Director of the United States Patent and Trademark Office*